(12) United States Patent
Gao et al.

(10) Patent No.: US 10,227,988 B2
(45) Date of Patent: Mar. 12, 2019

(54) BLOWER AND A BLOWING VACUUM DEVICE

(71) Applicant: Positec Power Tools (Suzhou) Co., Ltd., Suzhou (CN)

(72) Inventors: Zhendong Gao, Suzhou (CN); Andrea Cestonaro, Suzhou (CN); Xiahong Zha, Suzhou (CN); Fengli Zhao, Suzhou (CN); Lixiang Huo, Suzhou (CN); Xuefeng Yu, Suzhou (CN); Kang Song, Suzhou (CN); Zhanhu Ma, Suzhou (CN)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 0 days.

(21) Appl. No.: 15/108,641

(22) PCT Filed: Nov. 27, 2015

(86) PCT No.: PCT/CN2015/095830
§ 371 (c)(1),
(2) Date: Jun. 28, 2016

(87) PCT Pub. No.: WO2016/082796
PCT Pub. Date: Jun. 2, 2016

(65) Prior Publication Data
US 2017/0260985 A1    Sep. 14, 2017

(30) Foreign Application Priority Data

Nov. 28, 2014 (CN) .......................... 2014 1 0708685
Dec. 11, 2014 (CN) ..................... 2014 2 0785782 U
(Continued)

(51) Int. Cl.
*F04D 19/00* (2006.01)
*F04D 29/52* (2006.01)
(Continued)

(52) U.S. Cl.
CPC ........... *F04D 19/005* (2013.01); *A01G 20/47* (2018.02); *E01H 1/0809* (2013.01); *F04D 25/06* (2013.01);
(Continued)

(58) Field of Classification Search
CPC ...... F04D 19/005; F04D 25/06; F04D 29/325; F04D 29/522; F04D 29/545
See application file for complete search history.

(56) References Cited

U.S. PATENT DOCUMENTS 4,132,507 A    1/1979  Akiyama et al.
4,269,571 A *  5/1981  Shikutani ................. A47L 5/14
                                                              15/405
(Continued)

FOREIGN PATENT DOCUMENTS

CN    201381997 Y    1/2010
CN    102415852 A    4/2012
(Continued)

OTHER PUBLICATIONS

International Search Report and Written Opinion for International application No. PCT/CN2015/095830 dated Mar. 3, 2016.
(Continued)

*Primary Examiner* — Dung Van Nguyen
(74) *Attorney, Agent, or Firm* — Marshall, Gerstein & Borun LLP

(57) ABSTRACT

A blower, comprising: a housing comprising an air inlet, a motor disposed in the housing, an axial fan configured to be driven to rotate about a fan axis and generate an air flow by the motor, a blowing tube configured to be coupled to the housing and comprising an air outlet, a duct configured to guide the air flow to the air outlet, the housing and the blowing tube comprises an air passage which comprises an upstream region between the inlet and the axial fan and a
(Continued)

downstream region between the axial fan and the air outlet, the motor is disposed in the upstream region and the duct is disposed in the downstream region.

15 Claims, 12 Drawing Sheets

(30) Foreign Application Priority Data

| Dec. 19, 2014 | (CN) | 2014 1 0796437 |
|---|---|---|
| Feb. 6, 2015 | (CN) | 2015 1 0064165 |
| Feb. 6, 2015 | (CN) | 2015 1 0064758 |
| Feb. 6, 2015 | (CN) | 2015 1 0064893 |

(51) Int. Cl.
*F04D 29/54* (2006.01)
*F04D 25/06* (2006.01)
*F04D 29/32* (2006.01)
*E01H 1/08* (2006.01)
*F04D 25/08* (2006.01)
*A01G 20/47* (2018.01)

(52) U.S. Cl.
CPC ......... *F04D 25/084* (2013.01); *F04D 29/325* (2013.01); *F04D 29/326* (2013.01); *F04D 29/522* (2013.01); *F04D 29/545* (2013.01)

(56) References Cited

U.S. PATENT DOCUMENTS

| 4,880,364 A | 11/1989 | Berfield et al. |
|---|---|---|
| 5,975,862 A | 11/1999 | Arahata et al. |
| 6,105,206 A | 8/2000 | Tokumaru et al. |
| 7,739,773 B2 | 6/2010 | Schliemann et al. |
| 8,742,703 B2 | 6/2014 | Binder et al. |
| 8,894,382 B2 | 11/2014 | Binder |
| 8,918,956 B2 | 12/2014 | Pellenc |
| 2014/0050600 A1 | 2/2014 | Kodato et al. |
| 2014/0230181 A1* | 8/2014 | Yamaoka ............ E01H 1/0809 15/344 |
| 2015/0211535 A1* | 7/2015 | Kodato ............... A47L 5/14 417/371 |
| 2016/0169249 A1* | 6/2016 | Takahashi ........... F04D 29/667 417/411 |
| 2016/0208822 A1* | 7/2016 | Barth ................. F04D 19/002 |
| 2016/0324380 A1* | 11/2016 | Sergyeyenko ....... A01G 20/43 |
| 2017/0021489 A1* | 1/2017 | Bylund ............... A47L 5/14 |

FOREIGN PATENT DOCUMENTS

| CN | 103866725 A | 6/2014 |
|---|---|---|
| CN | 104074156 A | 10/2014 |
| CN | 203866754 U | 10/2014 |
| CN | 102606494 B | 11/2015 |
| DE | 377132 C | 6/1923 |
| DE | 102010046565 A1 | 3/2012 |
| DE | 102010054841 A1 | 6/2012 |
| EP | 2434162 A2 | 3/2012 |
| JP | 2004092161 A | 3/2004 |
| JP | 2011111793 A | 6/2011 |

OTHER PUBLICATIONS

Extended European Search Report for EP Patent Application No. 15863580.5, dated Oct. 11, 2018.

* cited by examiner

BLOWER AND A BLOWING VACUUM DEVICE

BACKGROUND OF THE INVENTION

In daily life, a blower is a common tool, usually used to clean up gardens, streets and other grounds.

For example, U.S. Pat. No. 4,880,364 discloses a blower, including a housing, a motor, a fan and an air duct. The fan rotates to generate air flow that exits out of the air duct. However, the fan of such a blower uses a centrifugal fan, an inlet is disposed in a direction along a rotation axis of the centrifugal fan and an outlet is disposed in a radial direction of the centrifugal fan. Owing to the limitation of the structure of the centrifugal fan per se, the volume of air exiting is often not great, and thus the blowing effect is not good, which cannot well meet users' demands.

For example, U.S. Pat. No. 5,975,862 discloses a blower that uses an engine as power, wherein the engine uses gasoline as fuel to serve as power, and the fan is still a centrifugal fan. However, as the power of the engine is greater than that of the general motor, the engine can drive the centrifugal fan to rotate at a higher rotating speed, thus outputting greater air volume and air velocity and meeting users' demands to some extent. However, as the blower using a gasoline engine often has greater work noise and uses gasoline to supply energy, it is easy to form atmospheric pollution, which is not environment-friendly enough.

For example, U.S. Pat. No. 7,739,773 discloses a blower, including a housing, an engine, a fan and an air duct. The fan changes to an axial fan. The engine still takes gasoline as power, and drives the axial fan to work through a transmission unit. However, the engine is disposed outside the housing, to cause the engine to be farther from the fan, and the volume of the whole blower seems to be greater; in addition, the engine is bulky, and does not conform to the portable and lightweight development trend. Moreover, the power source of the engine is still gasoline, which is easy to pollute the atmospheric environment.

Also, for some blowers on the market, the motor is disposed in the housing, used for driving the fan to rotate. The air duct includes an inlet and an outlet, and the air enters from the inlet and exits out of the outlet. In order to make the outlet blow out greater air volume, the fan is preferably an axial fan. The air duct is further internally provided with a duct that guides the air flow formed by the axial fan to move. In order to make the blower keep a compact structure, the motor is disposed in the duct. As the motor per se has a certain size, the duct must be provided with a sufficient size to accommodate the motor. However, the disadvantage brought about is reduction of the work efficiency of the whole blower.

Therefore, it is necessary to improve the existing technical means.

SUMMARY OF THE INVENTION

It is an object of the present invention to provide a blower that combines the size and the blowing efficiency.

In accordance with the invention, it is achieved in that a blower, comprising: a housing comprising an air inlet for the air entering in, a motor disposed in the housing, an axial fan configured to be driven to rotate about a fan axis and generate an air flow by the motor, a blowing tube configured to be coupled to the housing and comprising an air outlet for the air exiting, a duct configured to guide the air flow to the air outlet, the housing and the blowing tube define an air passage which comprises an upstream region between the air inlet and the axial fan and a downstream region between the axial fan and the air outlet, the motor is disposed in the upstream region and the duct is disposed in the downstream region.

In a preferred embodiment, the air inlet, the motor, the axial fan and the duct are aligned longitudinally in sequence.

In a preferred embodiment, the projections of the air inlet and the air outlet on the plane perpendicular to the fan axis coincide partly at least.

In a preferred embodiment, the air passage comprises a plurality of air surfaces perpendicular to the direction of the moving direction of the air flow, and the minimum area of the air surfaces in said upstream region is more than the rotation area defined by the rotating of the impellers of the axial fan.

In a preferred embodiment, the upstream region comprises a surrounding region surrounded the motor, and the ratio of the minimum area of the air surfaces in the surrounding region to the rotation area defined by the rotating of the impellers of the axial fan is between 1.5 to 2.5.

In a preferred embodiment, the upstream region comprises a transition region arranged between the motor and the axial fan in the longitudinal direction, and the inner side of the housing in the transition region is a smooth surface.

In a preferred embodiment, the ratio of the minimum area of the air surfaces in the transition region to the rotation area defined by the rotating of the impellers of the axial fan is between 1.5 to 2.5.

In a preferred embodiment, the longitudinal distance between the axial fan and the motor is between 20 to 30 mm.

In a preferred embodiment, the blower comprises a supporting unit for supporting the motor, the supporting unit which comprises an outer ring fixed to the housing, an inner ring fixed to the motor and a plurality of supporting components coupled to the outer ring and inner ring.

In a preferred embodiment, the supporting components extend in radial direction and a circulation area for the air flow is defined between the adjoining supporting components.

In a preferred embodiment, the inner ring comprises a center hole for passing through the motor shaft and ribs extending radially from the center hole.

In a preferred embodiment, the ratio of the area of the cross section of the motor to the area of the cross section of the air passage is between 0.6~0.7.

In a preferred embodiment, a detachable guard is disposed in the air inlet.

In a preferred embodiment, a labyrinthine pathway is disposed in the guard through which the air entering into the housing in a bending way.

In a preferred embodiment, the labyrinthine pathway comprises a first passage extending longitudinally and a second passage which has an angle to the first passage.

In accordance with the invention, it is achieved in that a blowing vacuum device selectively to work in blowing mode or in vacuum mode, comprising: a housing comprising an air inlet for the air entering in, a motor disposed in the housing, an axial fan configured to be driven to rotate about a fan axis and generate an air flow by the motor, a blowing assembly and a vacuum assembly which is selectively to be coupled to the housing, the blowing assembly is configured to be coupled to the housing and the axial fan rotating when in blowing mode, the vacuum assembly being configured to be coupled to the housing when in vacuum mode, the blowing assembly comprises a blowing tube configured to be coupled to the housing and comprising an air outlet for the air exiting, and a duct configured to guide the air flow to the air outlet, the housing and the blowing tube comprises an air passage which comprises an upstream region between the air inlet and the axial fan and a downstream region between the axial fan and the air outlet, the motor is disposed in the upstream region and the duct is disposed in the downstream region.

In accordance with the invention, it is achieved in that a blower comprising: a housing comprising an air inlet for the air entering in, a motor disposed in said housing, an axial fan configured to be driven to rotate about a fan axis and generate an air flow by said motor, a blowing tube configured to be coupled to the housing and comprising an air outlet for the air exiting, a duct configured to guide the air flow to the air outlet, the motor is disposed outside the duct.

In accordance with the invention, it is achieved in that a blower, comprising: a housing comprising an air inlet for the air entering in, a motor disposed in the housing, an axial fan configured to be driven to rotate about a fan axis and generate an air flow by the motor, a blowing tube configured to be coupled to the housing and comprising an air outlet for the air exiting, a duct configured to guide the air flow to the air outlet, the motor and the duct are disposed on the opposite sides of the axial fan respectively.

Compared with the prior art, the present invention has the following beneficial effects: the motor is disposed in an upstream region, while the duct is disposed in a downstream region, the selection of the motor may not be limited by the size of the duct, thus further improving the blowing efficiency, and the motor is disposed in the air duct, having a good heat dissipation effect. Moreover, using a structure with a motor such disposed causes the overall size of the blower or blowing vacuum device to be smaller.

To overcome the defect of the prior art, another technical problem to be solved by the present invention is to provide a blower that operates comfortably and reduces fatigue.

In accordance with the invention, it is achieved in that a blower, comprising: a housing comprising an air inlet for the air entering in, a handle coupled to the housing, a motor disposed in the housing, a fan configured to be driven to rotate and generate an air flow by the motor, a blowing tube configured to be coupled to the housing and comprising an air outlet for the air exiting, the handle comprises a grip portion, and the blowing tube extends along a first axis and the grip portion extends along a second axis, and the first axis and the second axis define a first plane, a second plane is defined to be parallel to the second axis and perpendicular to the first plane, the projection of the gravity of the blower on the second plane is in the scope of the projection of the grip portion on the second plane.

In a preferred embodiment, the angle between the first axis and the second axis is no less than 25 degrees.

In a preferred embodiment, the angle between the first axis and the second axis is 10 degrees.

In a preferred embodiment, the projection of the gravity of the blower on the horizontal plane is in the scope of the projection of the grip portion on the horizontal plane when the angle between the first axis and the horizontal plane is no less than 25 degrees.

In a preferred embodiment, the projection of the gravity of the blower on the horizontal plane is in the scope of the projection of the grip portion on the horizontal plane when the angle between the first axis and the horizontal plane is 10 degrees.

In a preferred embodiment, the gravity of the blower is between the fan and the motor.

In a preferred embodiment, the projection of the gravity of the blower on the second plane is in the scope of the projection of the motor on the second plane.

In a preferred embodiment, the projection of the motor on the second plane and the projection of the grip portion on the second plane coincide partly at least.

In a preferred embodiment, the fan is an axial fan.

In a preferred embodiment, the blower comprises a duct configured to guide the air flow moving to the outlet, the housing and the tube comprises an air passage which comprises an upstream region between the air inlet and axial fan and a downstream region between the axial fan and the air outlet, the motor is disposed in the upstream region and the duct is disposed in the downstream region.

In a preferred embodiment, the blower further comprises a battery pack coupled to the housing or the handle, the battery pack is electrically connected to the motor.

In a preferred embodiment, the motor is DC brushless motor.

In accordance with the invention, it is achieved in that a blower, comprising: a housing comprising an air inlet for the air entering in, a handle coupled to the housing, a motor disposed in the housing, a fan configured to be driven to rotate and generate an air flow by the motor, a blowing tube configured to be coupled to the housing and comprising an air outlet for the air exiting, the handle comprises a grip portion, the tube extends along a first axis and the grip portion extends along a second axis, the first axis and the second axis define a first plane, a third plane is defined to be parallel to the first axis and perpendicular to the first plane, the projection of the gravity of the blower on the third plane is in the scope of the projection of the grip portion on the third plane.

Compared with the prior art, according to the blower of the present invention, when a grip portion is gripped for a blowing operation, projection of the gravity of the blower on a third plane is located within a projection range of the grip portion on the third plane, to make it unnecessary for an operator to additionally overcome deflecting force of the blower, the operation is very comfortable, and fatigue of long-time work is avoided.

To overcome the defect of the prior art, the technical problem to be solved by the present invention is to provide a blower with high blowing efficiency and low power consumption.

In accordance with the invention, it is achieved in that a blower, comprising: a housing comprising an air inlet for the air entering in, a motor disposed in the housing, an axial fan configured to be driven to rotate and generate an air flow by the motor, the axial fan comprising a hub coupled to the motor and a plurality of impellers coupled to the hub, a blowing tube configured to be coupled to the housing and comprising an air outlet for the air exiting, a duct configured to guide the air flow to the air outlet, the diameter of the axial fan is less than 88 mm and the rotating speed of the motor is more than 21000 rpm.

In a preferred embodiment, the axial fan is disposed between the motor and the duct.

In a preferred embodiment, the fan axis is coincide with the center line of the tube.

In a preferred embodiment, the diameter of the axial fan is no less than 50 mm.

In a preferred embodiment, the diameter of the axial fan is 82 mm.

In a preferred embodiment, the rotation speed of the motor is no more than 50000 rpm.

In a preferred embodiment, the ratio of the diameter of the hub to the diameter of the axial fan is between 0.1 and 0.7.

In a preferred embodiment, the ratio of the diameter of the hub to the diameter of the axial fan is between 0.3 and 0.5.

In a preferred embodiment, the ratio of the diameter of the hub to the diameter of the axial fan is 0.34.

In a preferred embodiment, the axial fan further comprises attaching belt configured to surround all the impellers.

In a preferred embodiment, the distance between the attaching belt and the inner side of the housing is no more than 5 mm.

In a preferred embodiment, the distance between the attaching belt and the inner side of the housing is 1 mm.

In a preferred embodiment, the rotation of the impellers define a circle-shaped rotating surface, the ratio of the area of the outlet and the rotating surface is between 0.75 and 1.1.

In a preferred embodiment, the air volume blown out by the blower is more than 370 cfm.

In a preferred embodiment, the angle between the inner side of the housing coupled to the tube and the center line of the tube is no more than 5 degrees.

In a preferred embodiment, the angle between the outer side of the housing coupled to the tube and the center line of the tube is no more than 5 degrees.

Compared with the prior art, the diameter of the axial fan of the blower in the present invention is less than 88 mm, the rotating speed of the output shaft of the motor is greater than 21000 rpm, driving a small-diameter fan through a high rotating speed leads to less power consumption and can achieve higher blowing efficiency, making it convenient to blow up heavier leaves on a lawn, leaves in cracks and so on.

BRIEF DESCRIPTION OF THE DRAWINGS

The above and other object, features and advantages of the invention will become more apparent from the following description of embodiments in conjunction with the accompanying draws in which.

DETAILED DESCRIPTION OF THE INVENTION

Figure 1:
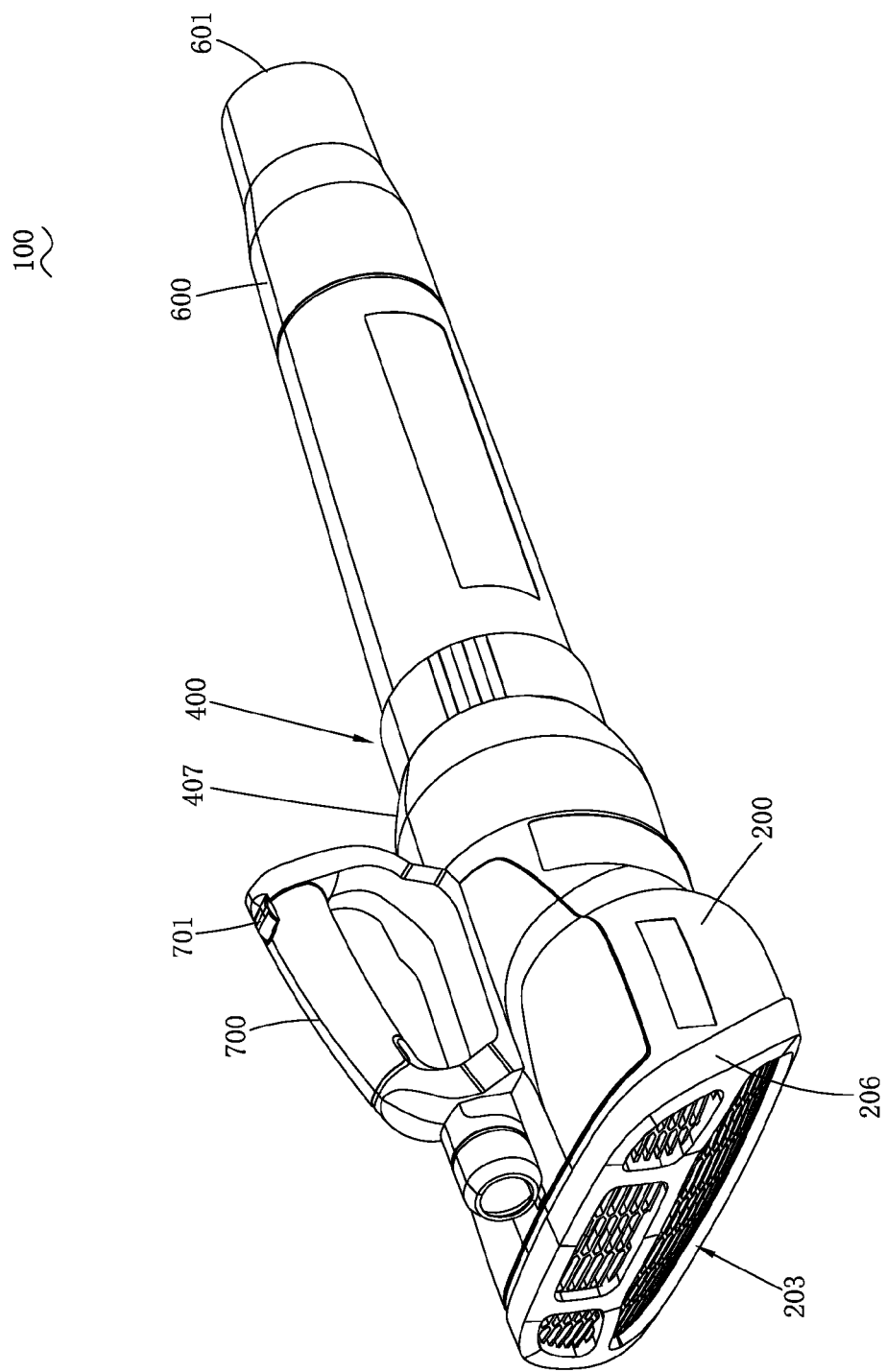
FIG. 1 is an overall view of the blower according to the first embodiment of the invention.

Preferred embodiments of the present invention are elaborated below with reference to the accompanying drawings, to enable advantages and features of the present invention to be understood by those skilled in the art more easily, thus making clearer definition to the protection scope of the present invention.

FIG. 1 to FIG. 11 illustrate a blower 100 according to a first embodiment of the present invention. The blower 100 includes a housing 200, a motor 300, a duct 400, a fan 500 and a blowing tube 600. The motor 300, the duct 400 and the fan 500 are all disposed in the housing 200. The blowing tube 600 is coupled to the housing 200.

Figure 2:
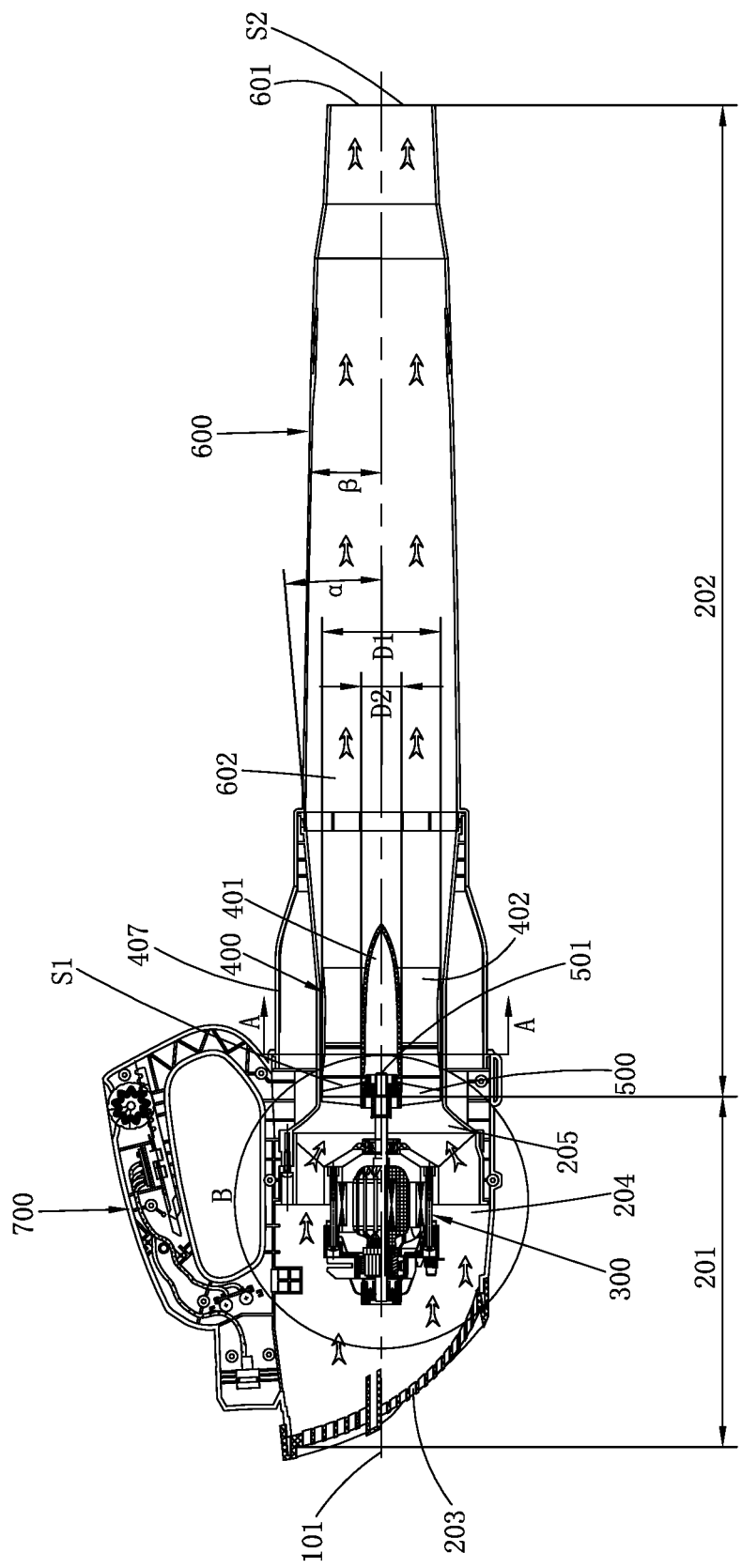
FIG. 2 is a view of the internal of a blower according to FIG. 1.
Figure 3:
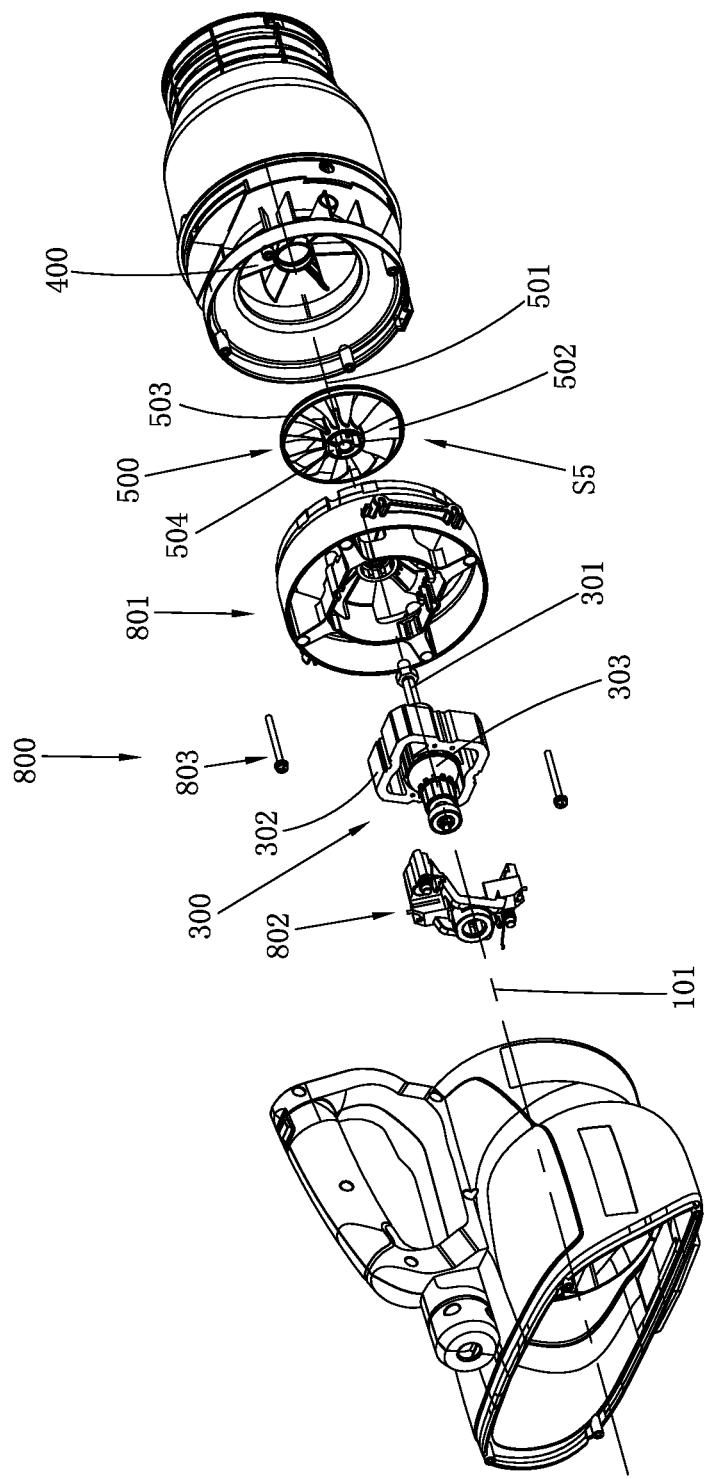
FIG. 3 is an exploded view of the internal of a blower according to FIG. 1.

As shown in FIG. 2 and FIG. 3, the blowing tube 600 and the housing 200 are coupled to form an air passage 602. The blowing tube 600 is provided thereon with an air outlet 601, and the air moves from the air passage 602 to the air outlet 601 and exits out of the air outlet 601, used for blowing away leaves and garbage on the ground. The motor 300 has a motor shaft 301, and the motor shaft 301 is coupled to the fan 500 and drives the fan 500 to rotate, to enable the fan 500 to rotate around its fan axis 501, thus driving the air to move to form air flow, as shown by the arrow in FIG. 2. Definitely, the motor shaft 301 may also be coupled to the fan 500 through a transmission unit. The transmission unit may be a common structure such as a planetary gear assembly. The air passage 602 includes an upstream region 201 and a downstream region 202, and the direction from the upstream region 201 to the downstream region 202 is defined as a longitudinal direction. The air substantially moves along the longitudinal direction. Moreover, the upstream region 201 is located on one side of the longitudinal direction of the fan 500, and the downstream region 202 is located on the other side of the longitudinal direction of the fan 500. The blower 100 defines a longitudinal axis 101 that extends along the longitudinal direction.

As shown in FIG. 3, in this embodiment, the fan 500 is preferably an axial fan. The axial fan includes a hub 504 and an impeller 502. A moving direction of the air flow formed by rotation of the impeller 502 of the axial fan is an extending direction of the fan axis 501, that is to say, the fan axis 501 also extends along the longitudinal direction and coincides with the longitudinal axis 101. The impeller 502 of the axial fan rotates to form a rotating surface which is disposed perpendicular to the longitudinal axis 101. The duct 400 is disposed much closer to the fan 500 than the blowing tube 600. The housing 200 is further provided thereon with an air inlet 203, and the air enters into the housing 200 from the air inlet 203. In the preferred embodiment, the air inlet 203, the motor 300, the fan 500 and the duct 400 are sequentially arranged along the longitudinal direction. Projections of the air inlet 203 and the air outlet 601 on the plane perpendicular to the longitudinal axis 101 coincide partly at least. The upstream region 201 refers to an area from the air inlet 203 to the plane where the center of the fan 500 is located, and the downstream region 202 refers to an area from the plane where the center of the fan 500 is located to the air outlet 601. When the fan 500 rotates, outside air enters into the housing 200 from the air inlet 203, and after passing through the fan 500 and the duct 400 sequentially, exits out of the air outlet 601 located in the blowing tube 600. Therefore, the motor 300 is disposed outside the duct 400, instead of being disposed inside the duct 400.

Figure 4:
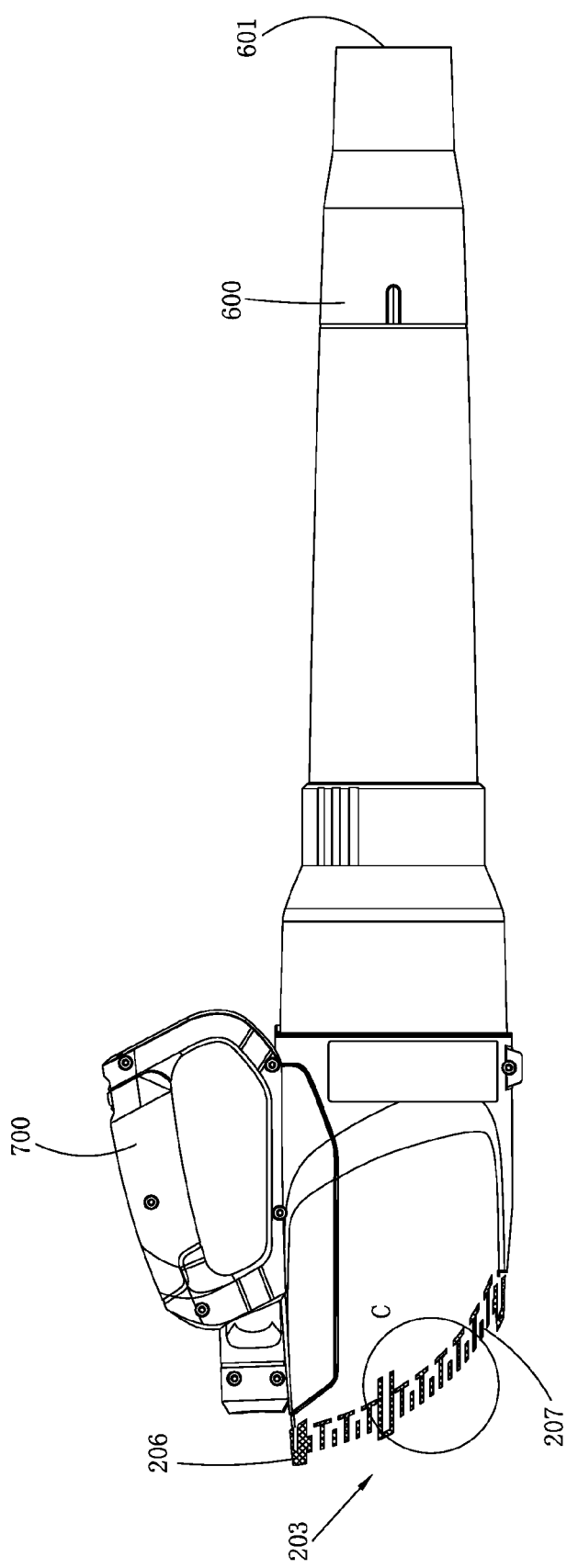
FIG. 4 is a view of the outlet of a blower according to FIG. 1.
Figure 5:
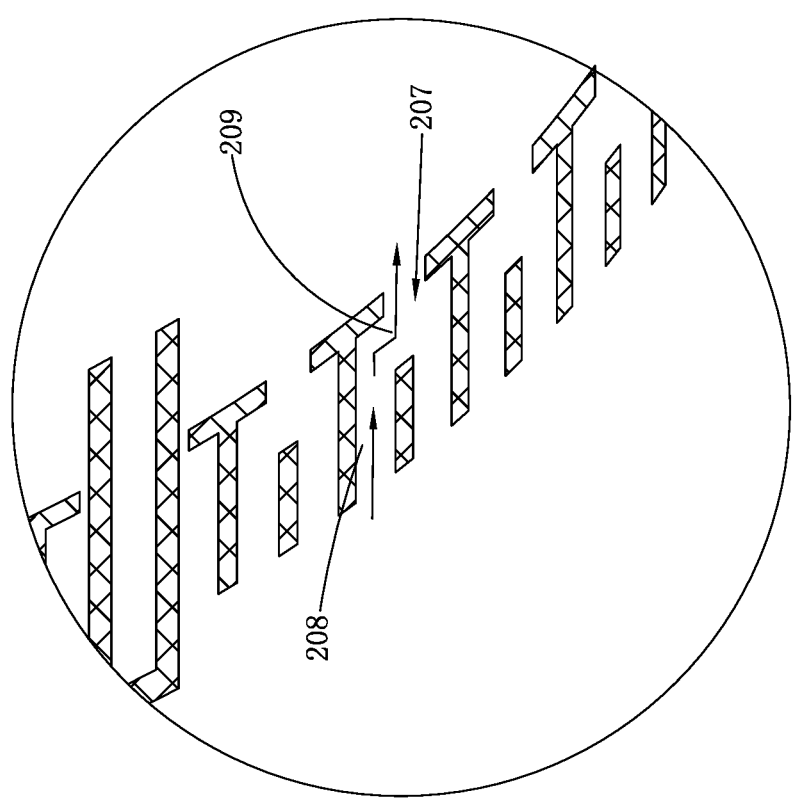
FIG. 5 is an amplified view of area C of a blower according to FIG. 4.

As shown in FIG. 4 and FIG. 5, a guard 206 detachable from the housing 200 is disposed in the air inlet 203. The guard 206 is detachably fixedly connected with the housing 200 through a bolt. The function of the guard 206 is preventing the user's finger from stretching into the housing 200, thus causing danger. The guard 206 includes a plurality of mesh structures. A rib is disposed between each mesh structure to enhance firmness of the whole guard 206. In addition, the guard 206, as a whole, is not disposed as a plane, but forms a curved inlet surface. In a preferred embodiment, the mesh structures are a labyrinthine pathway 207, that is to say, the air does not pass linearly when passing through the labyrinthine pathway, but the air enters in a bending way. The benefit of such design is increasing the total distance that the air passes through the guard 206, making a propagation path increase correspondingly when the air passes, thereby reducing generation of the noise. It is proved by tests that the guard 206 using the structure enables the noise to be reduced to 4 to 6 db. The labyrinthine pathway 207 includes a first passage 208 and a second passage 209 connected at an angle. The air first enters into the first passage 208 from the outside, then passes through the second passage 209, and finally enters into the housing 200. In a preferred embodiment, the first passage 208 substantially extends along the longitudinal direction, and the second passage 209 is disposed obliquely relative to the longitudinal direction.

The housing 200 further has a handle 700 that allows an operator to grip. Preferably, the handle 700 is further provided with a control switch 701.

Figure 6:
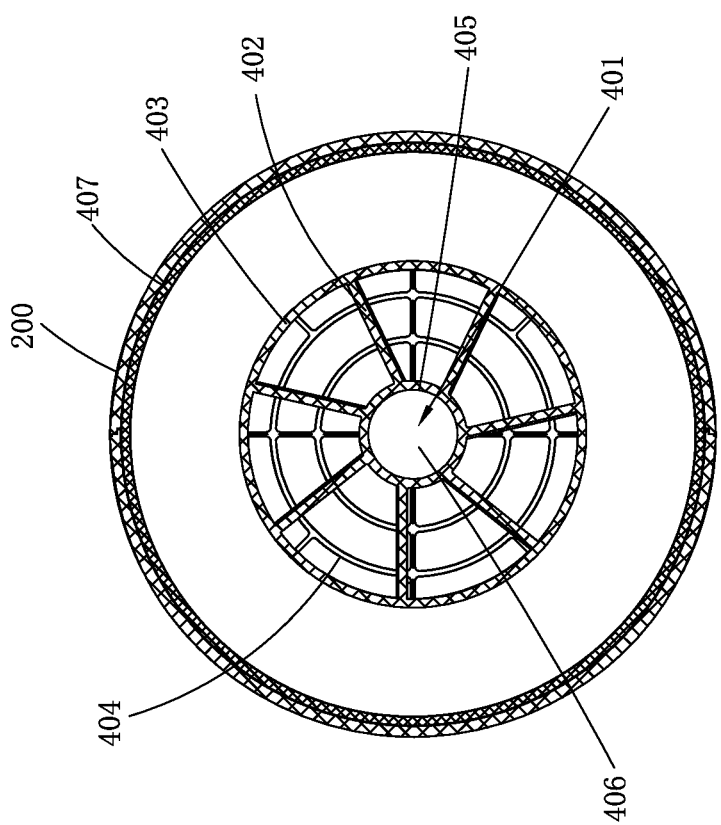
FIG. 6 is a section view along the line AA of a blower according FIG. 2.

As shown in FIG. 2, FIG. 3 and FIG. 6, the duct 400 is disposed in the downstream region 202. Compared with the blowing tube 600, the duct 400 is much closer to the fan 500. The function of the duct 400 is guiding the air flow generated by the fan 500 to move to the air outlet 601 of the blowing tube 600, and making directions of the air flow concentrated and uniform, thus enhancing air-out effect. The duct 400 includes a guiding cone 401, a guiding housing 403 that receives the guiding cone 401 and vanes 402 located between the guiding cone 401 and the guiding housing 403. The guiding cone 401 is substantially disposed along the moving direction of the air flow. The guiding cone 401 is located in the center of the air passage 602, and the guiding cone 401 includes an outer shell 405 and a cone cavity 406 inside the outer shell 405. An air circulation space is formed between the outer shell 405 of the guiding cone 401 and the guiding housing 403, and the cross section of the circulation space perpendicular to the longitudinal axis 101 is substantially annular. The vanes 402 are located in the annular circulation space, and are substantially distributed at an interval. The interval between every two vanes 402 allows the air flow to circulate. In this embodiment, the number of the vanes 402 is 7. However, the present invention does not limit the number of the vanes 402. In a preferred embodiment, the vanes 402 are disposed obliquely relative to the moving direction of the air flow, and an inclined angle is preferably 5 degrees to 15 degrees. The vanes 402 are at least fixedly connected with one of the guiding cone 401 and the guiding housing 403 in a radial direction. In a preferred embodiment, the volume of the guiding cone 401 is less than that of the motor 300. That is to say, the motor 300 cannot be disposed in the guiding cone 401. The guiding housing 403 is received in the housing 200, and is fixedly connected with the housing 200. In a preferred embodiment, the duct 400 further includes a safety cover 404, and the safety cover 404 is disposed perpendicular to the direction of the air flow or disposed perpendicular to the longitudinal direction. The function of the safety cover 404 is preventing foreign matters from entering into the duct 400. A fixing cover 407 used for fixing relative positions of the duct 400 and the housing 200 is further disposed between the duct 400 and the housing 200.

In this embodiment, the motor 300 is disposed as an AC motor. Definitely, it may also be disposed as a DC motor; correspondingly, a battery pack (not shown) is disposed on the housing 200 or handle 700, and the battery pack is electrically connected with the motor 300. Further, the motor 300 is disposed as a brushless DC motor.

Figure 7:
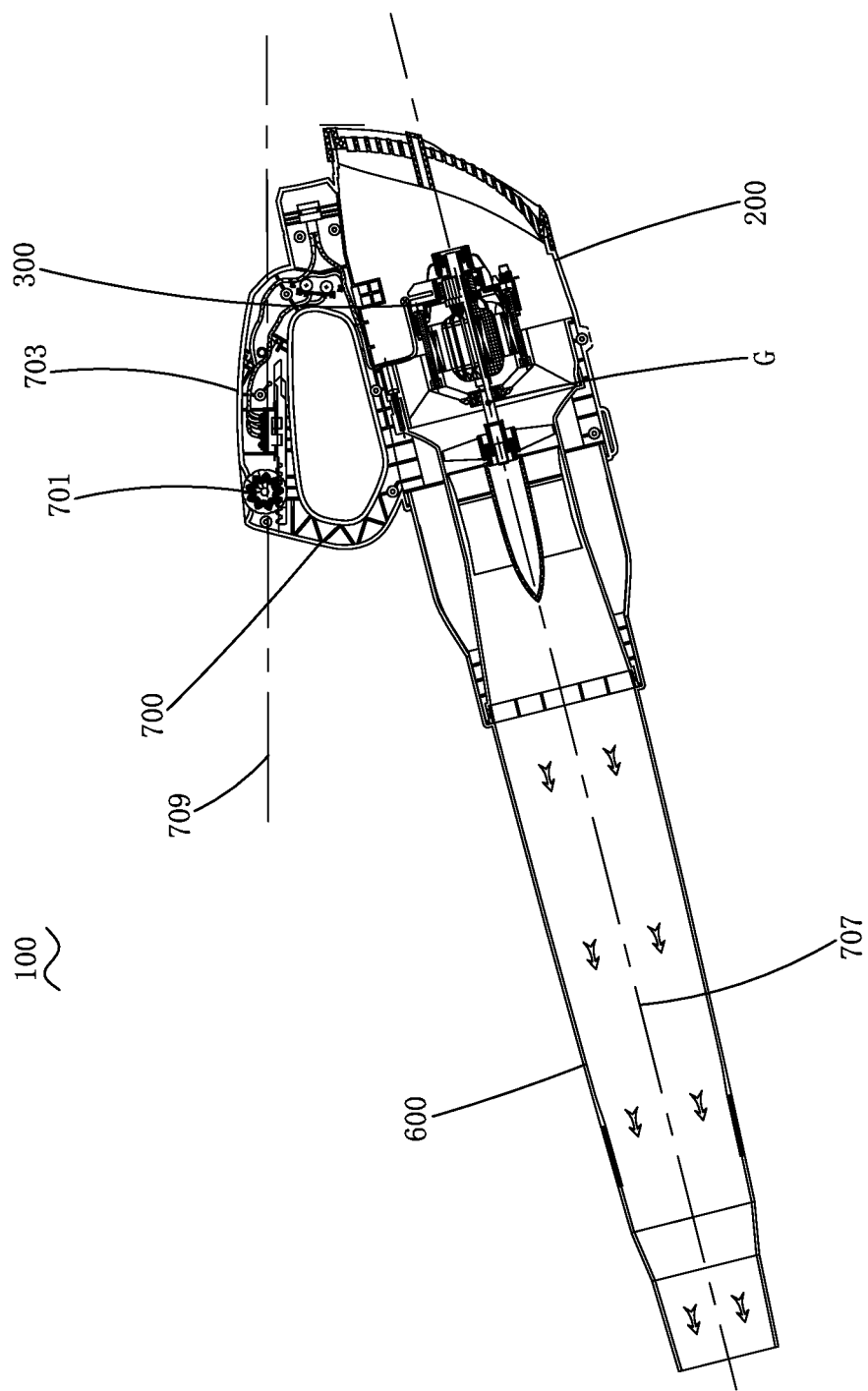
FIG. 7 is a section view of a blower in work condition according to FIG. 1.
Figure 8:
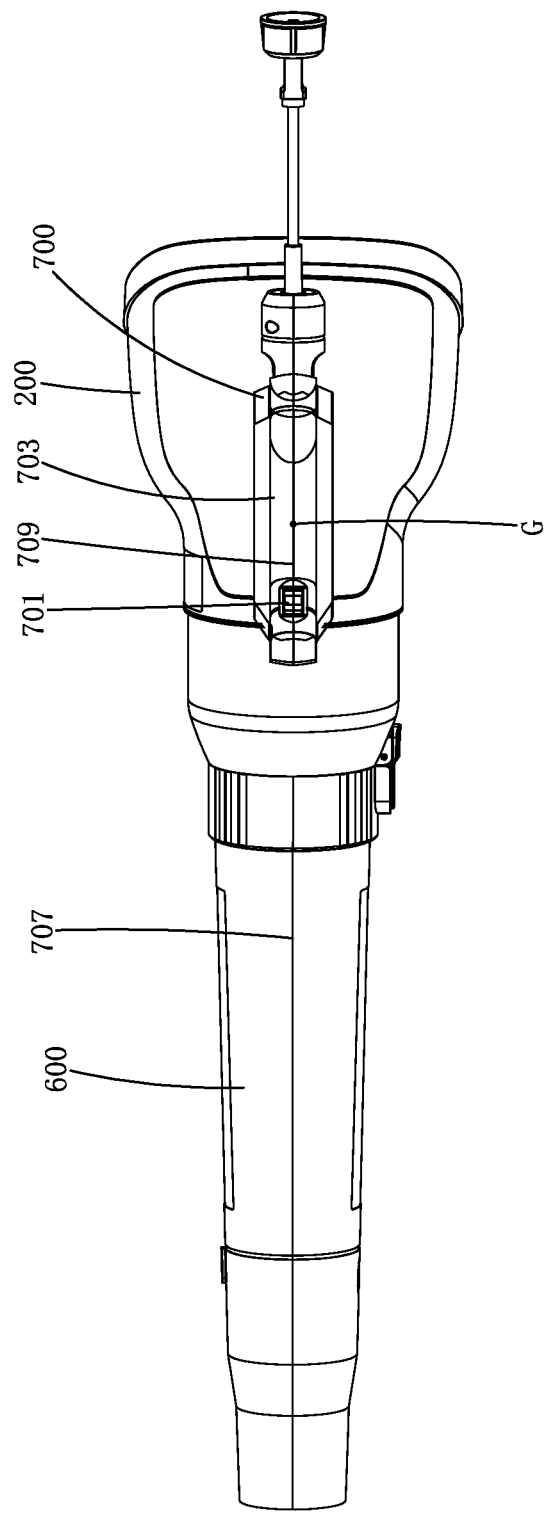
FIG. 8 is a vertical view of a blower according to FIG. 7.

As shown in FIG. 7 and FIG. 8, the handle 700 has a grip portion 703 that allows the operator to grip. In addition, the handle 700 is provided thereon with a control switch 701, and the control switch 701 is electrically connected with the motor 300, to control turn-on and turn-off of the motor 300. Preferably, the control switch 701 may further control the rotating speed of the motor 300.

The blowing tube 600 extends longitudinally along a first axis 707, the grip portion 703 extends longitudinally along a second axis 709, the first axis 707 and the second axis 709 define a first plane, the projection of the gravity G of the blower 100 on a second plane is located within a range of the projection of the grip portion 703 on the second plane, and the second plane is parallel to the second axis 709 and perpendicular to the first plane. In this way, when the grip portion 703 is gripped to perform a blowing operation, generally, the second axis 709 of the grip portion 703 is substantially parallel to the horizontal plane, at this point, the projection of the gravity G of the blower 100 on the second plane is located within the range of the projection of the grip portion 703 on the second plane, making it unnecessary for the operator to additionally overcome the deflecting force of the blower 100, the operation is very comfortable, and fatigue of long-time work is avoided.

In this embodiment, the motor 300 is heavy and occupies the majority of the overall weight of the blower 100, in addition, the blowing tube 600 is made of a lighter and thinner material, and by disposing the motor 300 outside the duct 400 and locating the motor 300 below the grip portion 703 of the handle 700, it is thus ensured that the projection of the gravity G of the blower 100 on the second plane is located within the range of the projection of the grip portion 703 on the second plane, to make the blower 100 operated comfortably.

In addition, the projection of the gravity G of the blower 100 on a third plane is located within the range of the projection of the grip portion 703 on the third plane, and the third plane is parallel to the first axis 707 and perpendicular to the first plane. In this way, it is also ensured that, when the grip portion 703 is gripped for a blowing operation, the operator does not need to additionally overcome the deflecting force of the blower 100, the operation is very comfortable, and fatigue of long-time work is avoided.

An angle between the first axis 707 and the second axis 709 is not greater than 25 degrees. When the blower 100 is operated for a blowing operation, the first axis 707 of the blowing tube 600 is at an angle with the horizontal plane which is not greater than 25 degrees, and at this point, the blowing efficiency of the blower 100 is higher. Therefore, with such setting, it can be ensured that, during the blowing operation, the second axis 709 of the grip portion 703 is substantially parallel to the horizontal plane, so that, while the blower 100 ensures high blowing efficiency, the operation is more comfortable, and fatigue of long-time work is further avoided.

Preferably, the angle between the first axis 707 and the second axis 709 is substantially 10 degrees. When the blower 100 is operated for a blowing operation, the first axis 707 of the blowing tube 600 is at an angle with the horizontal plane which is substantially 10 degrees, and at this point, the blowing efficiency of the blower 100 is higher. Therefore, with such setting, it can be ensured that, during the blowing operation, the second axis 709 of the grip portion 703 is substantially parallel to the horizontal plane, so that, while the blower 100 ensures high blowing efficiency, the operation is more comfortable.

In this embodiment, when the first axis 707 is at an angle with the horizontal plane which is not greater than 25 degrees, the projection of the gravity G of the blower 100 on the horizontal plane is within a range of the projection of the grip portion 703 on the horizontal plane. With such setting, it can be ensured that, during the blowing operation, while the blower 100 ensures high blowing efficiency, the operation is labor-saving and comfortable, and fatigue of long-time work is avoided.

Further, when the first axis 707 is at an angle with the horizontal plane which is 10 degrees, the projection of the gravity G of the blower 100 on the horizontal plane is within a range of the projection of the grip portion 703 on the horizontal plane.

Preferably, the gravity G of the blower 100 is located between the fan and the motor 300.

Further, the projection of the gravity G of the blower 100 on the second plane is within a range of the projection of the motor 300 on the second plane.

In addition, the projection of the motor 300 on the second plane coincides at least partly with the projection of the grip portion 703 on the second plane. In this way, it can further ensure that the projection of the gravity G of the blower 100 on the second plane is within a range of the projection of the grip portion 703 on the second plane, making the blower 100 have a compact structure and operated comfortably.

Figure 9:
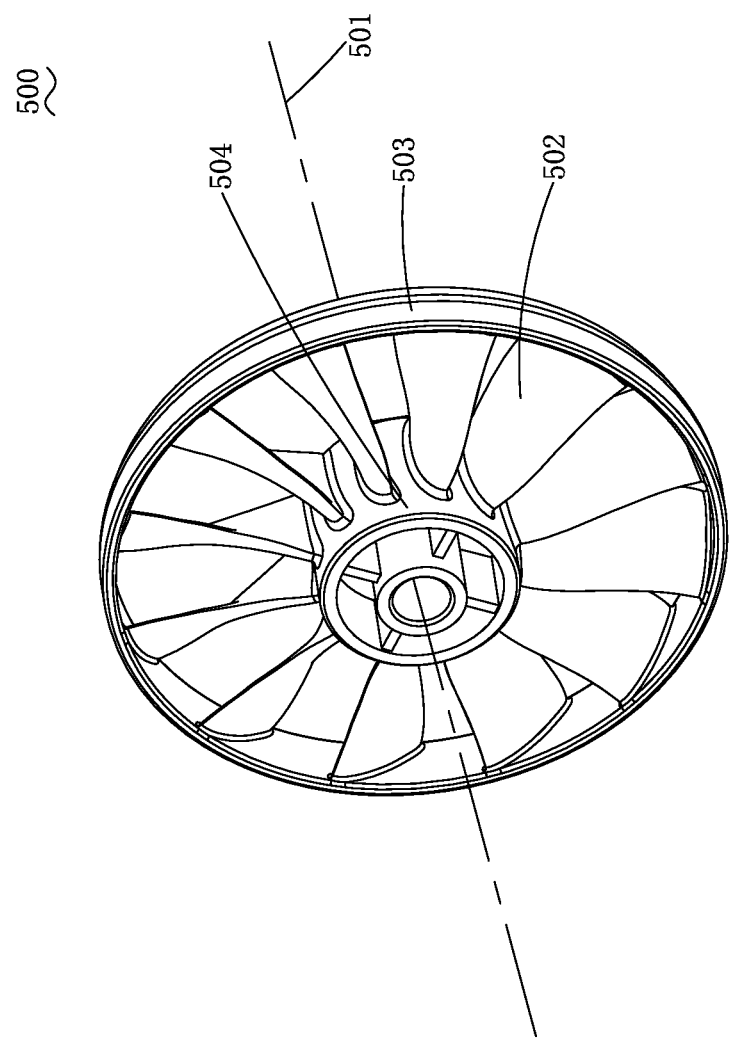
FIG. 9 is a 3-dimension view of a fan of a blower according to FIG. 3.

As shown in FIG. 3 and FIG. 9, the fan 500 of the blower 100 in the present invention is preferably an axial fan, and the axial fan can provide a better blowing effect than a centrifugal fan. The fan 500 is disposed between the motor 300 and the duct 400, in other words, the motor 300 and the duct 400 are located on two sides of the fan 500. The fan axis 501 of the fan 500 coincides with a centerline of the blowing tube 600. The housing 200 and the blowing tube 600 have an air passage 602 therein, the air passage 602 includes an upstream region 201 from the air inlet 203 to the fan 500 and a downstream region 202 from the axial fan 500 to the air outlet 601, the motor 300 is disposed in the upstream region 201, and the duct 400 is disposed in the downstream region 202.

The motor 300 is disposed in the upstream region 201 in the housing 200, the motor 300 has a motor shaft 301, and the motor 301 is connected with the fan 500 and can drive the fan 500 to rotate around its fan axis 501, thus driving the air to move from the upstream region 201 to the downstream region 202 to form air flow. In this embodiment, the fan 500 includes a hub 504 coupled to the motor shaft 301 and a plurality of impellers 502 installed on the hub 504, but the present invention does not limit the specific number of the impellers 502 strictly. The fan 500 further includes an attaching belt 503, and the attaching belt 503 surrounds and connects all the impellers 502. The setting of the attaching belt 503, on the one hand, can increase rigidity of the fan 500, prolong the service life of the fan 500, and prevent the fan 500 from being damaged after being used for a period of time; on the other hand, can increase stability of the fan 500 after high-speed rotation, and help to reduce the noise produced by the fan 500 after high-speed rotation.

Table 1 lists data indicating sizes of the noise produced by the fan 500 of the blower 100 before and after installation of the attaching belt 503 measured through experiments when rotating. It can be seen from Table 1 that, before installation of the attaching belt 503, an average value of four sets of noise data measured ahead is 100 db; correspondingly, after installation of the attaching belt 503, the average value of four sets of noise data measured ahead is 96.8 db. In addition, it can also be seen from Table 1 that, before installation of the attaching belt 503, the average value of four sets of noise data measured behind is 99.4 db; correspondingly, after installation of the attaching belt 503, the average value of four sets of noise data measured behind is 98.2 db. It can be seen from the data that, after installation of the attaching belt 503, the noise measured in different directions when the fan 500 operates is reduced.

TABLE 1

| | Test azimuth | noise level (db) | | | | mean |
|---|---|---|---|---|---|---|
| before installation of | ahead (N) | 99.7 | 100.1 | 99.9 | 100.2 | 100 |
| the attaching belt | behind (S) | 99.4 | 98.7 | 99.6 | 99.9 | 99.4 |
| after installation of | ahead (N) | 96.9 | 96.6 | 96.5 | 97.1 | 96.8 |
| the attaching belt | behind (S) | 98.4 | 98.9 | 98.1 | 97.4 | 98.2 |

As shown in FIG. 9, in the present invention, the diameter of the fan 500 is less than 88 mm, and the output rotating speed of the motor shaft 300 is more than 21000 rpm. Preferably, the fan diameter D1 of the fan 500 is set within a range of 50 mm to 88 mm, and in this embodiment, the fan diameter D1 of the fan 500 is set as 82 mm.

During design, a series of experimental data of fan diameter, motor speed, air volume and air velocity that the blower 100 relates is measured. In the experiment, the motor speed is selected to be greater than 21000 rpm and is set as 25000 rpm, and values of the air volume and the air velocity produced when the fan 500 having a different diameter is selected are correspondingly measured. The data shows that, when the fan diameter is greater than 88 mm, higher air volume and air velocity can be acquired, but a consequence thus brought about is that power consumption of the blower 100 will be higher, the data measured in the experiment is that the power consumption has exceeded 1011 W, and when a battery pack is used as energy, available working hours of the blower 100 is severely shortened. Therefore, to reduce the power consumption of the blower 100, preferably, the fan diameter of the blower 100 is set as less than 88 mm. When the fan diameter is set as less than 88 mm, with decrease of the value, the power consumption of the blower 100 gradually decreases, but a consequence thus brought about is that the air volume and the air velocity of the blower 100 present a gradually decreasing trend on the whole. When the fan diameter is set as less than or equal to 50 mm, the measured air volume value is correspondingly less than or equal to 200 CFM, the measured air velocity value is correspondingly less than or equal to 70 MPH, at this point, the blowing effect of the blower 100 is worse, and the air-out efficiency is lower. Therefore, while the power consumption is considered, the blowing effect of the blower 100 should also be considered, and the fan diameter is preferably set within a range of 50 mm to 88 mm. The data shows that, when the fan diameter is set within a range of 50 mm to 82 mm, with increase of the fan diameter, the air volume, the air velocity and the power consumption of the blower 100 increase, and when the fan diameter is set as 82 mm, the air volume, the air velocity and the power consumption of the blower 100 all reach a maximum value. When the fan diameter is set within a range of 82 mm to 88 mm, with increase of the fan diameter, the air volume, the air velocity and the power consumption of the blower 100 increase, and when the fan diameter is set as 88 mm, the air volume, the air velocity and the power consumption of the blower 100 all reach a maximum value. When the fan diameter is in an interval of 50 mm to 82 mm, with increase of the fan diameter, the air volume, the air velocity and the power consumption are all enhanced. When the fan diameter is in an interval of 82 mm to 88 mm, with increase of the fan diameter, the air volume, the air velocity and the power consumption are still enhanced, but the power consumption is significantly enhanced at this point. Generally, when the fan diameter is in an interval of 50 mm to 88 mm, with increase of the fan diameter, the air volume, the air velocity and the power consumption are all in a growing trend, however, when the diameter exceeds 82 mm, the amplitude of increase of the air velocity and the air volume is not great, while at this point, the power consumption is significantly increased. After the fan diameter exceeds 82 mm, great-amplitude increase of the power consumption only begets small-amplitude increase of the air velocity and the air volume; therefore, if the fan diameter is set as 82 mm, while the blower 100 is controlled to lower power consumption, the air volume and the air velocity of the blower 100 are increased, and higher blowing efficiency and better blowing effect are obtained finally.

In addition, preferably, the output rotating speed of the motor shaft 301 is set within a range of 21000 rpm to 50000 rpm. The rotating speed of the motor shaft 301 is increased and the size of the fan 500 is reduced, to form a layout of driving the fan at a high rotating speed. Such design can reduce the power consumption, so that, when single DC battery pack time is ensured, the air velocity is increased, thus obtaining higher blowing efficiency and better blowing effect.

In this embodiment, a ratio of the hub diameter D2 of the hub 504 of the fan 500 to the fan diameter D1 of the fan 500 is within a range of 0.1 to 0.7. Generally, the ratio of the hub diameter D2 of the fan 500 to the fan diameter D1 is also referred to as hub ratio, and description is given below directly with the hub ratio. In the event that the size of the outer diameter of the fan 500 is fixed, the hub ratio decides the proportions between the hub 504 and the impellers 502, and will finally affect the air-out condition of the fan 500. According to a set of data obtained through an experiment about a relationship between the hub ratio and the air volume, during measurement, the rotating speed of the motor is set as constant as 24000 rpm, the minimum air sectional area of the upstream region 201 is 7190 MM$^2$, that is to say, the minimum sectional area of the section that can allow the air flow to pass from the air inlet 203 to the fan 500 is 7190 MM$^2$, the fan diameter D1 of the fan 500 is set as 82 mm, and in this condition, a common data relationship between the hub ratio and the air volume is measured. The data shows that, with increase of the hub ratio, the air volume gradually decreases, to make the blower 100 obtain better bellowing effect, the blower 100 can provide a greater air volume, when the hub ratio is selected as 0.1-0.3, the air volume can obtain a greater value, but a consequence brought about is that the hub is too small but is greater relative to the impellers, resulting in that the noise produced during rotation is greater, and stability of the fan 500 is worse, which is easy to damage. When the hub ratio is selected to be 0.3 to 0.5, not only can a higher air volume be obtained, but also the stability of the fan 500 is better and the noise produced during rotation is smaller. In the specific embodiment, the hub ratio is set as 0.34. Other values within the range of 0.1 to 0.7 can also be used, especially the values within a range of 0.3 to 0.5.

The fan 500 is disposed in the housing 200, the fan 500 includes a hub 504 coupled to the motor shaft 301 and a plurality of impellers 502 installed on the hub 504, and outer edges of the impellers 502 of the fan 500 are further provided with an attaching belt 503. The shortest distance between the attaching belt 503 and an inner wall of the housing 200 is 0 mm to 5 mm (not including end points). Preferably, the shortest distance between the attaching belt 503 and the inner wall of the housing 200 is set as 1 mm, and such design can provide a better blowing effect while ensuring a condition of assembling the fan 500 and the housing 200.

In this embodiment, the blower 100 is provided with a motor 300, a fan 500, a duct 400 and a blowing tube 600 along a longitudinal direction from the upstream region 201 to the downstream region 202. The housing 200 is further provided with an air inlet 203, the air inlet 203 is disposed in the upstream region 201 and disposed near the fan 500, and the end of the blowing tube 600 is provided with an air outlet 601 that allows air flow to exit finally. When the fan 500 is driven by the motor shaft 301 to rotate, outside air enters into the housing 200 from the air inlet 203, then passes through the interior of the duct 400 and the blowing tube 600, and exits out of the air outlet 601 located in the downstream region 202.

The impellers 502 of the fan 500 rotate to form an annular rotating surface, the rotation area is S1, and the area of the fan 500 minus the area of the hub 504 is the area of the rotating surface S1. The end of the tub 600 is provided with an air outlet 601, a ratio of the area S2 of the air outlet 601 to the area of the rotating surface S1 is within a range of 0.75 to 1.1, such setting can improve flowing characteristics of the air flow to thus increase the blowing efficiency, and the blower 100 can maintain a higher air velocity, and the loss of the air velocity is small.

Table 2 lists a set of data relationship between the outlet area/rotation area and the air velocity obtained through experiments. During experimental determination, the rotating speed of the motor is as constant as 24000 rpm, the outlet area is set as constant as 3957 MM$^2$, and under the condition that the rotating speed of the motor and the outlet area are constant, a series of data in Table 2 are measured. It can be seen from the data in Table 2 that, when the outlet area/rotation area is set within a range of 0.75 to 1.1, the blower 100 can obtain a higher air velocity, and the loss of the air velocity is small.

TABLE 2

| outlet area/rotation area | <0.75 | 0.75-0.85 | 0.85-1.1 | >1.1 |
|---|---|---|---|---|
| air velocity (M/S) | <45 | 54-57 | 52-55 | <50 |

In this embodiment, the air volume of the blower 100 is greater than 370 cfm, and such design can be more convenient to blow up heavier leaves falling on the lawn, leaves in the cracks and the like.

The blower 100 includes a housing 200 and a blowing tube 600, the motor 300 and the fan 500 are disposed in the housing 200, and the blowing tube 600 is provided thereon with an air outlet 601. The housing 200 is coupled to the blowing tube 600, thus forming a complete air passage that can allow the air flow to pass. An angle of inner side α between the inner wall of the housing 200 coupled to the blowing tube 600 and the centerline of the blowing tube 600 is less than or equal to 5 degrees. An angle of outer side β between the outer wall of the blowing tube 600 coupled to the housing 200 and the centerline of the blowing tube 600 is less than or equal to 5 degrees. Such angle setting expands the outlet sectional area of the air flow on the housing 200, and the sectional area of the air flow after entering to the blowing tube 600 presents a gradually decreasing trend. Such layout setting causes the air volume to increase before the air flow enters into the blowing tube 600 and the air volume to increase after the air flow enters into the blowing tube 600, thus correspondingly improving blowing efficiency of the blower 100, and a better blowing effect can be achieved.

As shown in FIG. 2 and FIG. 3, the motor 300 is located in the upstream region 201. That is to say, the motor 300 is located between the air inlet 203 and the fan 500, and the air inlet 203 and the fan 500 are located on two sides of the motor 300. Moreover, the motor 300 and the housing 200 are kept at a space gap. The air entering from the air inlet 203 will first pass through the gap between the motor 300 and the housing 200, and then is driven by the fan 500 to rotate, thus producing air flow. As the motor 300 is positioned between the air inlet 203 and the fan 500, the air always passes around the motor 300, and can produce an additional cooling effect on the motor 300. Therefore, it is unnecessary to additionally dispose a cooling fan, the cooling demands of the motor 300 can be met, and such design simplifies the structure of the blower 100. The motor 300 is disposed outside the duct 400, the size of the duct 400 can be made smaller, and the size of the duct 400 is not limited by the size of the motor 300. Alternatively, when the size of the duct 400 is designed, it is unnecessary to consider the limitation of the size of the motor 300, thus further enhancing the blowing efficiency of the duct 400. The motor 300 includes a stator 302 and a rotor 303 rotating relative to the stator 302. The rotor 303 is disposed around the motor shaft 301 extending longitudinally. The motor shaft 301 rotates around its axis. The motor shaft 301 is coupled to the fan 500 through power, so as to drive the fan 500 to rotate around the fan axis 501. In this embodiment, the fan 500 is directly installed on the motor shaft 301, and the axis of the motor shaft 301 coincides with the fan axis 501. The motor 300 of this embodiment has a smaller volume than the traditional engine that takes gasoline as fuel. Therefore, the cross section area of the motor 300 perpendicular to the longitudinal direction can be smaller than the cross section area of the air passage 602 perpendicular to the longitudinal direction, so that the motor 300 can be placed in the air passage 602. In a preferred embodiment, a ratio of the cross section area of the motor 300 perpendicular to the longitudinal direction to the cross section area of the air passage 602 perpendicular to the longitudinal direction is 0.6 to 0.7.

Figure 10:
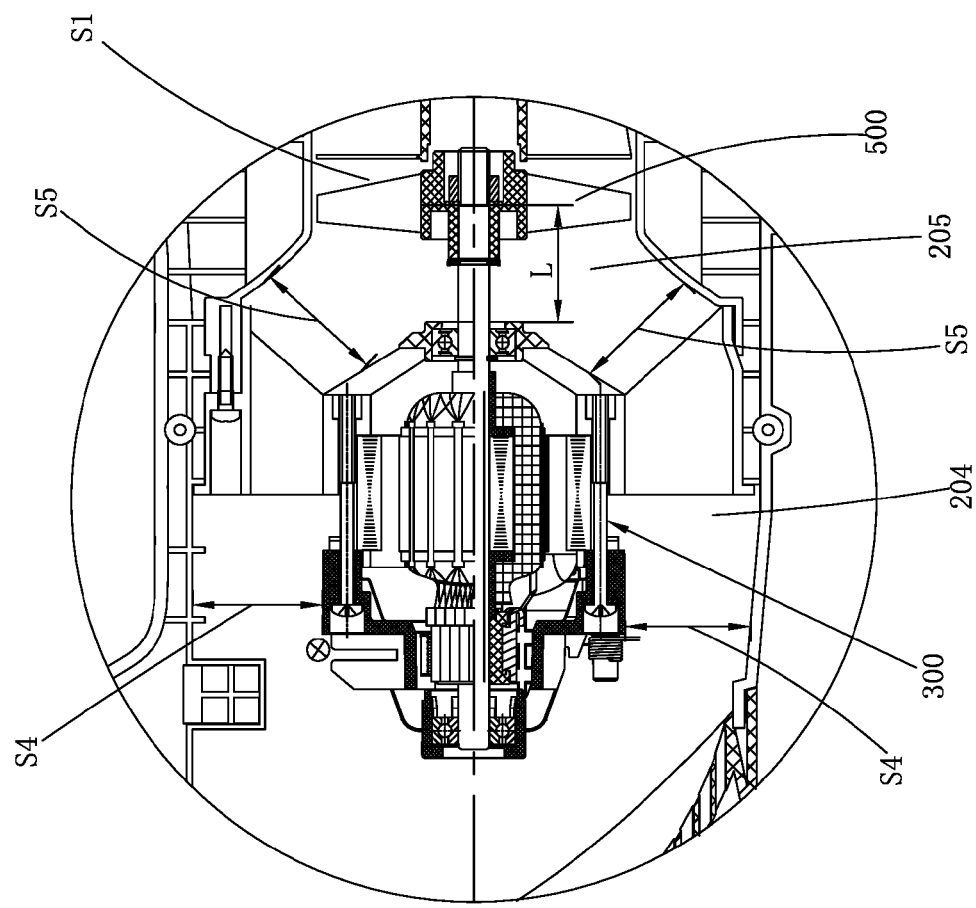
FIG. 10 is an amplified view of area B of a blower according to FIG. 2.

As the motor 300 is located in the upstream region 201, the motor 300 occupies a certain space and volume, the air moves along the air passage 602, and the air passage 602 includes a plurality of air surfaces. The air surfaces are sections of the air passage 602 perpendicular to the moving direction of the air flow. To ensure enough inlet amount, the minimum area of the air surfaces in the upstream region 201 is more than the rotation area defined by the rotating of the impellers of the fan 500, which can ensure that a steady flow of air is supplied and contacts the impellers of the fan 500, thereby ensuring ongoing blowing. Similar to the Cannikin Law, the size of the air amount that the upstream region 201 supplies for the fan 500 depends upon the minimum area of the air surfaces in the upstream region 201. Thus, even if the area of air surfaces in other places of the upstream region 201 is too big, the inlet amount of the fan 500 will not change if the minimum area of the air surfaces therein is still unchanged. Therefore, the inlet amount of the fan 500 can be enhanced only if the minimum area of the air surfaces of the whole upstream region 201 is enhanced. As shown in FIG. 10, after the air enters into the upstream region 201 from the air inlet 203, as the part of the upstream region 201 close to the air inlet 203 is not blocked, the area of air surfaces of the part can be ensured to be more than the rotation area of the fan. The part of the upstream region 201 surrounded the motor 300 is defined as a surrounding area 204, and owing to blockage by the motor 300, the area of air surfaces of the surrounding area 204 will be small. However, to ensure good blowing efficiency, the minimum area in the area of air surfaces S4 along the longitudinal direction of the surrounding area 204 is designed to be more than the area of the rotating surface S1 of the impellers 502 of the axial fan. Through testing, the relationship between the ratio of the minimum area of the air surfaces S4 in the surrounding area 204 to the area of the rotating surface S1 of the impellers 502 of the axial fan and the blowing effect is as in the table below:

TABLE 3

| | air surface S4: rotating surface S1 | | | | | | | |
|---|---|---|---|---|---|---|---|---|
| | 2.5 | 2.2 | 2.0 | 1.9 | 1.8 | 1.7 | 1.6 | 1.5 |
| blow speed (MPH) | 106 | 104 | 104 | 102 | 100 | 97 | 95 | 93 |
| blowing amount (CFM) | 397 | 390 | 388 | 383 | 376 | 365 | 356 | 348 |

It is thus clear that, when the ratio of the minimum area of the air surfaces S4 in the surrounding area 204 to the area of the rotating surface S1 of the axial fan ranges between 1.5 and 2.5, the blowing effect is significantly enhanced. When the ratio of the minimum area of the air surfaces S4 in the surrounding area 204 to the area of the rotating surface S1 of the axial fan is more than 2, the air velocity and the air volume are enhanced slightly. However, at this point, the ratio of the areas is more than 2, the minimum area of the air surfaces of the surrounding area 204 is great, and correspondingly, the volume of the whole blower 100 is also great. Therefore, in this embodiment, the ratio of the minimum area of the air surfaces S4 in the surrounding area 204 to the area of the rotating surface S1 of the axial fan is 1.8. In this condition, the air volume blown out by the blower 100 can reach 376 CFM, and the air velocity can reach 100 MPH, so the volume of the blower 100 also falls within a reasonable range while the design requirements of the air velocity and the air volume of the blower 100 are met.

The upstream region 201, in addition to including the surrounding area 204, also includes a transition region 205 which is between the surrounding area 204 and the fan 500. The transition region 205 is used for guiding the air passing through the surrounding area 204 to the fan 500. The air enters into the transition region 205 from the surrounding area 204, and then contacts the fan 500 after passing through the transition region 205. In a preferred embodiment, the inner wall of the housing 200 where the transition region 205 is located is a smooth surface, which can thus effectively reduce the loss of the air flow passing through the transition region 205. In addition, to ensure good blowing efficiency, the ratio of the minimum area of the air surfaces S5 in the transition region 205 to the rotation area S1 is between 1.5 and 2.5. Preferably, the ratio is 1.8. That is to say, the minimum area of the air surfaces S5 in the transition region 205 is at least identical to the minimum area of the air surfaces S4 in the surrounding area 204, which can thus ensure that a certain amount of air passes through the transition region 205. To ensure the minimum area of the air surfaces in the transition region 205, there is a longitudinal distance L between the motor 300 and the fan 500, and the longitudinal distance L is 20 mm to 30 mm; preferably, the longitudinal distance L between the motor 300 and the fan 500 is 25 mm.

The blower 100 further includes a supporting unit 800 for fixing the motor 300 with the housing 200. The supporting unit 800 is also located in the upstream region 201, and the supporting unit 800 includes a first bracket 801, a second bracket 802 and a coupling element 803 connecting the first bracket 801 and the second bracket 802 along the longitudinal direction. In this embodiment, the coupling element 803 is a bolt. The bolt connects the first bracket 801 and the second bracket 802 along the longitudinal direction.

Figure 11:
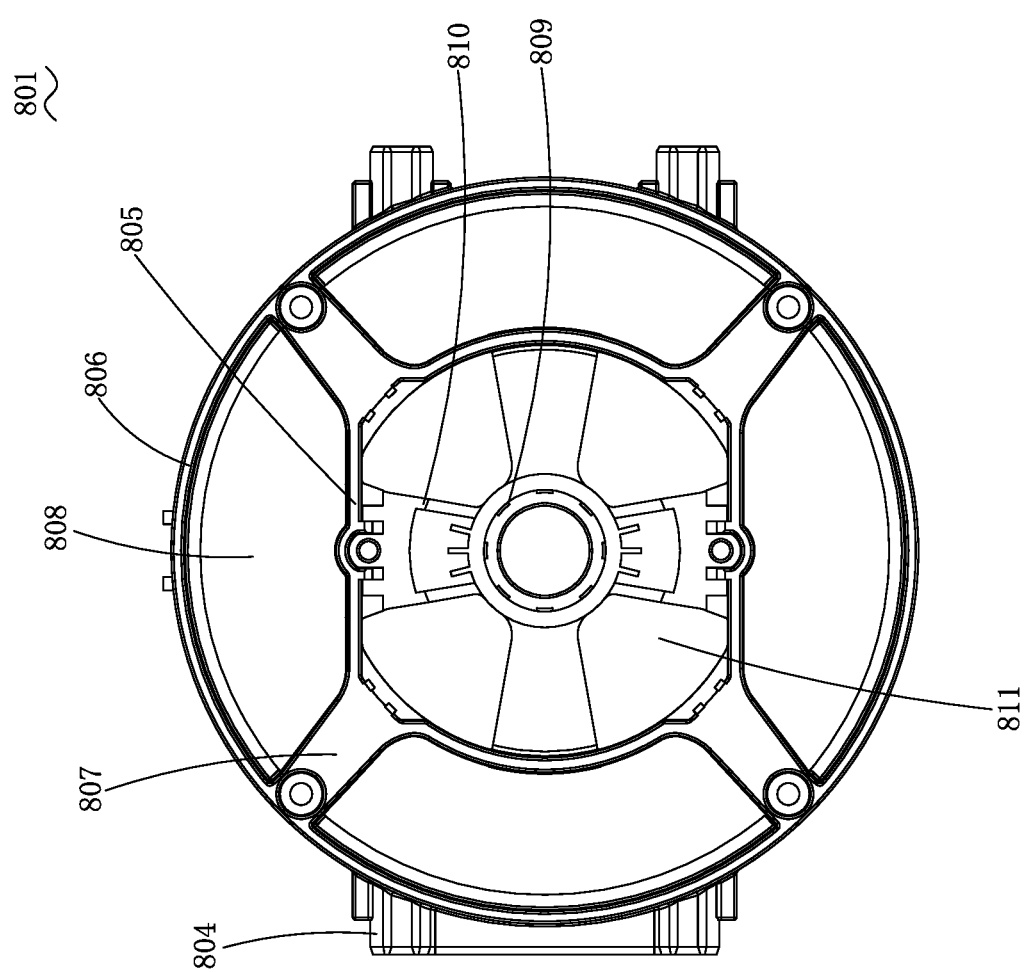
FIG. 11 is a 3-dimension view of a first bracket of a blower according to FIG. 1.

Referring to FIG. 2, FIG. 3 and FIG. 11, the first bracket 801, on the one hand, is fixedly connected with the housing 200, and on the other hand, plays a role of supporting the motor 300. The first bracket 801 is provided thereon with a fixing unit 804 fixedly clamped with an inner side of the housing 200, and the first bracket 801 supports the motor 300. The first bracket 801 includes an inner ring 805 for fixing the motor 300 and an outer ring 806 for fixing the housing 200. The inner ring 805 and the outer ring 806 are disposed concentrically, and further, the center of the inner ring 805 and the center of the outer ring 806 are located on the motor axis. An outer surface of the outer ring 806 is provided with a fixing unit 804. The longitudinal width of the outer ring 806 is greater than that of the inner ring 805, and the inner ring 805 is basically received in the space embraced by the outer ring 806. A plurality of supporting components 807 are disposed between the inner ring 805 and the outer ring 806. The supporting components 807 substantially extend along a radial direction of the motor axis 501. One end of the supporting components 807 is coupled to the outer ring 806, and the other end is coupled to the inner ring 805. The plurality of supporting components 807 are circumferentially disposed evenly, and a first circulation area 808 for the air flow to pass through is disposed around each supporting component 807. In a preferred embodiment, the number of the supporting components 807 is 4, and an angle between two adjoining supporting components is 90 degrees. Inside the inner ring 805 is a hole 809 that accommodates the motor shaft 301 to pass. A plurality of ribs 810 are disposed between the hole 809 and the inner ring 805. A second circulation area 811 for the air flow to pass through is disposed around the ribs 810.

Figure 12:
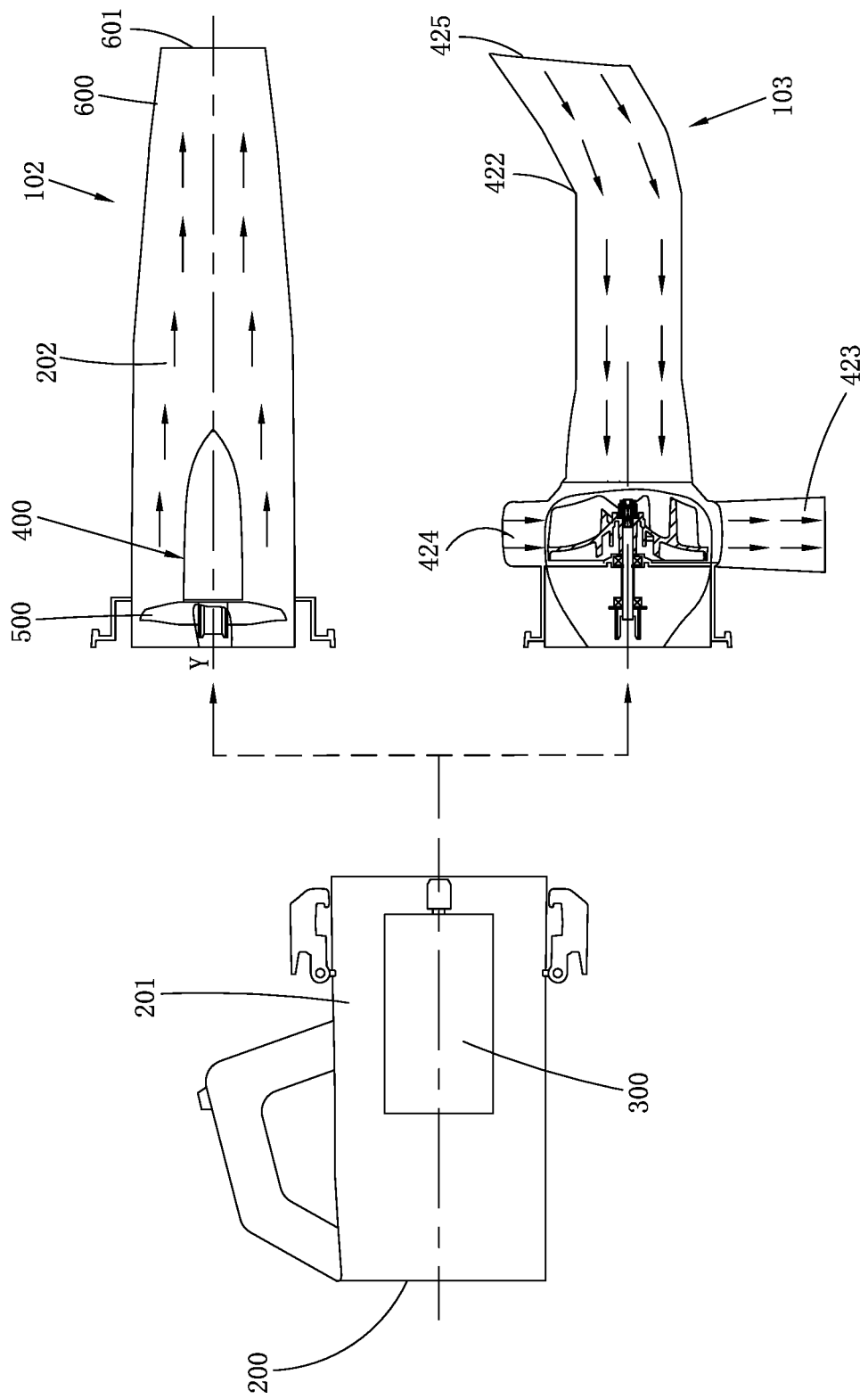
FIG. 12 is an overall view of a blower according to the second embodiment of the invention.

In another embodiment as shown in FIG. 12, the blowing vacuum device, in addition to having a blowing function, also has a vacuum function. Therefore, the blowing vacuum device may be selectively switched to a blowing mode or a vacuum mode. The blowing vacuum device mainly includes a housing 200 and a blowing assembly 102 and a vacuum assembly 103 which is coupled to the housing 200 respectively. In the blowing mode, the blowing assembly 102 is coupled to the housing 200. In the vacuum mode, the vacuum assembly 103 is coupled to the housing 200. In this embodiment, the blowing assembly 102 includes a blowing tube 600 and a duct 400. A fan 500 is preferably also disposed in the blowing assembly 102 and disposed near the duct 400. The motor 300 is still disposed in the housing 200, the fan 500 is an axial fan, and the motor 300 drives the axial fan to rotate and produce air flow. The vacuum assembly 103 includes a vacuum tube 422 and an exit tube 423. In the blowing mode, the blowing assembly 102 is coupled to the housing 200 to form a fluid passage, and the motor 300 cooperates with the fan 500 in the blowing assembly 102 to produce blowing fluid. A main body 2 is provided with an air inlet, the air enters into the main body 2 from the air inlet and forms air flow via the fan 500, and the air flow exits out of the air outlet 601 of the blowing tube 600. At this point, the motor 300 is still in the upstream region 201, and the duct 400 is in the downstream region 202. When the blowing vacuum device switches to the vacuum mode, the blowing assembly 102 is removed from the housing 200, and the vacuum assembly 103 is installed onto the housing 200. The vacuum assembly 103 and the housing 200 form an air passage for vacuum. Leaves, dust and other garbage, along with the air, are sucked in from the vacuum opening 425 of the vacuum tube 422, and then is discharged to the collection device after passing through the exit tube 423. The air can naturally escape from the collection device, while the garbage is collected in the collection device. Preferably, a centrifugal fan 1031 is disposed in the vacuum assembly 103. In this embodiment, the exit tube 423 further includes a spiral tunnel 424. The spiral tunnel 424 has a radius gradient to the center. The vacuum tube 422 is coupled to the center of the spiral tunnel 424, causing the air to enter into the center of the spiral tunnel 424 from the vacuum tube 422, which is also a starting part of the spiral tunnel 424. Then the air moves along the spiral tunnel 424, until the air is discharged from the end of the spiral tunnel 424 and enters into the part of the exit tube 423 coupled to the collection device. The centrifugal fan 1031 may be disposed in the spiral tunnel 424.

The above embodiments merely express several implementations of the present invention, which are described relatively specifically and in detail but cannot be construed as limitations to the patent scope of the present invention. It should be noted that those of ordinary skill in the art can also make variations and improvements without departing from the concept of the present invention, all of which belong to the protection scope of the present invention.

What is claimed is:

1. A blower, comprising:
a housing comprising an air inlet for the air entering in,
a motor disposed in said housing,
an axial fan configured to be driven to rotate about a fan axis and generate an air flow by said motor,
a blowing tube configured to be coupled to said housing and comprising an air outlet for the air exiting,
a duct configured to guide the air flow to said air outlet,
wherein said housing and said blowing tube define an air passage which comprises an upstream region between said air inlet and said axial fan and a downstream region between said axial fan and said air outlet,
wherein said motor is disposed in said upstream region and said duct is disposed in said downstream region, wherein the air passage comprises a plurality of air surfaces perpendicular to the moving direction of the air flow, and the minimum area of the air surfaces in said upstream region is more than the rotation area defined by the rotating of the impellers of said axial fan.

2. The blower according to claim 1, wherein said air inlet, said motor, said axial fan and said duct are aligned longitudinally in sequence.

3. The blower according to claim 1, wherein the projections of said air inlet and said air outlet on the plane perpendicular to said fan axis coincide partly at least.

4. The blower according to claim 1, wherein said upstream region comprises a surrounding region surrounded said motor, and the ratio of the minimum area of said air surfaces in said surrounding region to said rotation area defined by the rotating of said impellers of said axial fan is between 1.5 to 2.5.

5. The blower according to claim 1, wherein said upstream region comprises a transition region arranged between said motor and said axial fan in the longitudinal direction, and the inner side of said housing in said transition region is a smooth surface.

6. The blower according to claim 5, wherein the ratio of the minimum area of said air surfaces in said transition region to said rotation area defined by the rotating of said impellers of said axial fan is between 1.5 to 2.5.

7. The blower according to claim 5, wherein the longitudinal distance between said axial fan and said motor is between 20 to 30 mm.

8. The blower according to claim 1, wherein said blower comprises a supporting unit for supporting said motor which comprises an outer ring fixed to said housing, an inner ring fixed to said motor and a plurality of supporting components coupled to said outer ring and inner ring.

9. The blower according to claim 8, wherein said supporting components extend in radial direction and a circulation area for the air flow is defined between said adjoining supporting components.

10. The blower according to claim 9, wherein said inner ring comprises a center hole for passing through a motor shaft and ribs extending radially from said center hole.

11. The blower according to claim 1, wherein the ratio of the area of the cross section of said motor to the area of the cross section of said air passage is between 0.6~0.7.

12. The blower according to claim 1, wherein a detachable guard is disposed in said air inlet.

13. The blower according claim 12, wherein a labyrinthine pathway is disposed in the guard through which the air entering into said housing in a bending way.

14. The blower according claim 13, wherein said labyrinthine pathway comprises a first passage extending longitudinally and a second passage which has an angle to said first passage.

15. A blower, comprising:
a housing comprising an air inlet for the air entering in,
a motor disposed in said housing,
an axial fan configured to be driven to rotate about a fan axis and generate an air flow by said motor,
a blowing tube configured to be coupled to said housing and comprising an air outlet for the air exiting,
a duct configured to guide the air flow to said air outlet,
wherein said motor is disposed outside the duct,
wherein said housing and said blowing tube define an air passage which comprises an upstream region between said air inlet and said axial fan, wherein the air passage comprises a plurality of air surfaces perpendicular to the moving direction of the air flow, and the minimum area of the air surfaces in said upstream region is more than the rotation area defined by the rotating of the impellers of said axial fan.

* * * * *